(12) United States Patent
Delfranco et al.

(10) Patent No.: US 11,875,290 B2
(45) Date of Patent: Jan. 16, 2024

(54) METHOD AND SYSTEM FOR MANAGING MAINFRAME BILLABLE RESOURCES

(71) Applicant: JPMorgan Chase Bank, N.A., New York, NY (US)

(72) Inventors: Michael Delfranco, Edison, NJ (US); Debabrata Ghosh, Mckinney, TX (US); Sanjay Jain, Bridgewater, NJ (US); Brian S Elliott, Worthington, OH (US); Joseph Alan Blue, Dublin, OH (US); Julia Elliott, Lancaster, OH (US); Sivaprasad Avula, Hackettstown, NJ (US); David Thomas Crossen, Lexington, OH (US); Angelica Casali, Elmhurst, NY (US); Anthony Iannolo, Syosset, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 455 days.

(21) Appl. No.: 17/070,524

(22) Filed: Oct. 14, 2020

(65) Prior Publication Data
US 2022/0114521 A1  Apr. 14, 2022

(51) Int. Cl.
| | |
|---|---|
| *G06Q 10/0631* | (2023.01) |
| *G06Q 10/10* | (2023.01) |
| *G06Q 20/12* | (2012.01) |
| *G06F 40/289* | (2020.01) |
| *G06Q 30/018* | (2023.01) |
| *G06F 16/13* | (2019.01) |
| *H04L 9/40* | (2022.01) |
| *G06Q 40/12* | (2023.01) |

(52) U.S. Cl.
CPC ....... *G06Q 10/06315* (2013.01); *G06F 16/13* (2019.01); *G06F 40/289* (2020.01); *G06Q 10/10* (2013.01); *G06Q 20/127* (2013.01); *G06Q 30/0185* (2013.01); *G06Q 40/12* (2013.12); *H04L 63/102* (2013.01)

(58) Field of Classification Search
None
See application file for complete search history.

(56) References Cited

U.S. PATENT DOCUMENTS

| | | | | |
|---|---|---|---|---|
| 10,275,563 | B2 * | 4/2019 | Schafer | G06F 30/17 |
| 10,706,477 | B1 * | 7/2020 | Le chevalier | G06V 40/1365 |
| 11,049,608 | B2 * | 6/2021 | Yardley | G16H 40/20 |

(Continued)

*Primary Examiner* — Fateh M Obaid
(74) *Attorney, Agent, or Firm* — GREENBLUM & BERNSTEIN P.L.C.

(57) ABSTRACT

A method for managing mainframe billable resources for a plurality of mainframe environments is provided. The method includes receiving a job file from a user, the job file including a batch file relating to a mainframe job and a mainframe task; identifying an override statement in the job file; determining, based on a result of the identifying, a mapping strategy according to a predetermined criterion, the mapping strategy relating to a mapping of the job file to a billing entity identifier; authorizing the job file based on the billing entity identifier and a logon identifier corresponding to the user; mapping the job file to the billing entity identifier based on the determined mapping strategy; recording, in a memory, information relating to the mapping; and executing, in a mainframe environment, the job file.

18 Claims, 6 Drawing Sheets

(56) References Cited

U.S. PATENT DOCUMENTS

| | | | | |
|---|---|---|---|---|
| 2003/0098991 | A1* | 5/2003 | Laverty | G06F 3/1205 |
| | | | | 358/1.18 |
| 2004/0267595 | A1* | 12/2004 | Woodings | G06F 16/258 |
| | | | | 705/7.14 |
| 2007/0288208 | A1* | 12/2007 | Grigsby | G06Q 10/06 |
| | | | | 703/2 |
| 2008/0103869 | A1* | 5/2008 | Hutty | G06Q 10/063 |
| | | | | 705/7.14 |
| 2010/0123917 | A1* | 5/2010 | Minagawa | G06F 3/1296 |
| | | | | 358/1.9 |
| 2010/0142535 | A1* | 6/2010 | Swainston | H04L 61/5038 |
| | | | | 370/395.3 |
| 2012/0230577 | A1* | 9/2012 | Calman | G06Q 20/3223 |
| | | | | 382/138 |
| 2013/0290208 | A1* | 10/2013 | Bonmassar | G06Q 10/1053 |
| | | | | 705/321 |
| 2014/0020061 | A1* | 1/2014 | Popp | H04W 12/35 |
| | | | | 726/3 |
| 2017/0076398 | A1* | 3/2017 | Clark | G06Q 20/405 |

* cited by examiner

METHOD AND SYSTEM FOR MANAGING MAINFRAME BILLABLE RESOURCES

BACKGROUND

1. Field of the Disclosure

This technology generally relates to methods and systems for managing mainframe billable resources, and more particularly to methods and systems for managing mainframe billable resources for a plurality of mainframe environments by proactively mapping, authorizing, and enforcing utilization of a standard mainframe accounting entity.

2. Background Information

Many business entities allocate mainframe resources by using resource billing schemas such as, for example, a mainframe accounting entity to manage and enforce utilization of the mainframe resources. The mainframe accounting entity enable tracking of mainframe resource usage by a mainframe job and attributing the usage to a user. Historical by, such use of the mainframe accounting entity has resulted in varying degrees of success when a plurality of mainframe accounting entities are utilized together as a result of merging mainframe environments.

One drawback of using the mainframe accounting entity is that in many instances, the plurality of mainframe accounting entities are largely incompatible with each other due to unique accounting complexities of each of the merged mainframe environments. As a result, converting each of the plurality of mainframe accounting entities into a standardized mainframe accounting entity may not be accomplished without numerous operational risks. Additionally, retroactive mapping of legacy accounting information to the standardized mainframe accounting entity is resource intensive and lacks billing accuracy.

Therefore there is a need for a system that proactively maps, authorizes, and enforces the use of a standard mainframe accounting entity which manages mainframe billable resources for a plurality of different mainframe environments.

SUMMARY

The present disclosure, through one or more of its various aspects, embodiments, and/or specific features or sub-components, provides, inter alia, various systems, servers, devices, methods, media, programs, and platforms for managing mainframe billable resources for a plurality of mainframe environments by proactively mapping, authorizing, and enforcing utilization of a standard mainframe accounting entity.

According to an aspect of the present disclosure, a method for managing mainframe billable resources for a plurality of mainframe environments is provided. The method may be implemented by at least one processor. The method may include receiving at least one job file from a user, the at least one job file may include a batch file relating to at least one from among a mainframe job and a mainframe task; identifying an override statement in the at least one job file; determining, based on a result of the identifying, at least one mapping strategy according to at least one predetermined criterion, the at least one mapping strategy may relate to a mapping of the at least one job file to a billing entity identifier; authorizing the at least one job file based on the billing entity identifier and a logon identifier corresponding to the user; mapping the at least one job file to the billing entity identifier based on the determined at least one mapping strategy; recording, in a memory, information relating to the mapping; and executing, in a mainframe environment, the at least one job file.

In accordance with an exemplary embodiment, the method may further include determining a grace period for the at least one job file when the logon identifier is not authorized to use the billing entity identifier, the grace period may include a deferred enforcement period corresponding to a warning mode; and appending, to the at least one job file, grace period data may relate to the determined grace period.

In accordance with an exemplary embodiment, the method may further include preventing the execution of the at least one job file based on the grace period data when the logon identifier is not authorized to use the billing entity identifier; logging information relating to at least one from among the at least one job file, the logon identifier, and the billing entity identifier; and recording, in the memory, the logged information.

In accordance with an exemplary embodiment, the method may further include receiving a change promotion request relating to a deployment of the batch file into a change repository; identifying a job control language corresponding to the received change promotion request; invoking at least one batch utility function; authorizing, by using the at least one batch utility function, the change promotion request based on the identified job control language; and executing, in the mainframe environment, the change promotion request based on a result of the authorizing.

In accordance with an exemplary embodiment, for authorizing the change promotion request, the method may further include determining whether an authorized accounting entity is assigned to the job control language; determining whether an authorized promoter is utilized to deploy the job control language for the authorized accounting entity; and determining whether the job control language is deployed into an authorized change repository for the authorized accounting entity.

In accordance with an exemplary embodiment, the at least one batch utility function may include at least one from among an update utility function, a deploy utility function, and an execute utility function.

In accordance with an exemplary embodiment, the update utility function may further include copying the job control language input library into a new input library; automatically inserting, into the new input library, a comment card that includes an accounting entity corresponding to the job control language; and verifying that the new input library is authorized to use the accounting entity.

In accordance with an exemplary embodiment, the deploy utility function may further include determining a first authority level of a promoter corresponding to the change promotion request; and determining a second authority level of a protected change repository corresponding to the billing entity identifier.

In accordance with an exemplary embodiment, the execute utility function may further include verifying, by using the logon identifier, the execution of the at least one job file with the billing entity identifier; verifying, by using the logon identifier and a job name corresponding to the at least one job file, the execution of the at least one job file with a dynamic billing entity identifier; and verifying, by using the logon identifier, the execution of the at least one job file with the billing entity identifier included in the job control language.

In accordance with an exemplary embodiment, the override statement may include a job billing entity identifier that is supplied by the user.

According to an aspect of the present disclosure, a computing device configured to implement an execution of a method for managing mainframe billable resources for a plurality of mainframe environments is disclosed. The computing device comprising a processor; a memory; and a communication interface coupled to each of the processor and the memory, wherein the processor may be configured to receive at least one job file from a user, the at least one job file may include a batch file relating to at least one from among a mainframe job and a mainframe task; identify an override statement in the at least one job file; determine, based on a result of the identifying, at least one mapping strategy according to at least one predetermined criterion, the at least one mapping strategy may relate to a mapping of the at least one job file to a billing entity identifier; authorize the at least one job file based on the billing entity identifier and a logon identifier corresponding to the user; map the at least one job file to the billing entity identifier based on the determined at least one mapping strategy; record, in the memory, information relating to the mapping; execute, in a mainframe environment, the at least one job file.

In accordance with an exemplary embodiment, the processor may be further configured to determine a grace period for the at least one job file when the logon identifier is not authorized to use the billing entity identifier, the grace period may include a deferred enforcement period corresponding to a warning mode; and append, to the at least one job file, grace period data relating to the determined grace period.

In accordance with an exemplary embodiment, the processor may be further configured to prevent the execution of the at least one job file based on the grace period data when the logon identifier is not authorized to use the billing entity identifier; log information relating to at least one from among the at least one job file, the logon identifier, and the billing entity identifier; and record, in the memory, the logged information.

In accordance with an exemplary embodiment, the processor may be further configured to receive a change promotion request relating to a deployment of the batch file into a change repository; identify a job control language corresponding to the received change promotion request; invoke at least one batch utility function; authorize, by using the at least one batch utility function, the change promotion request based on the identified job control language; and execute, in the mainframe environment, the change promotion request based on a result of the authorizing.

In accordance with an exemplary embodiment, to authorize the change promotion request, the processor may be further configured to determine whether an authorized accounting entity is assigned to the job control language; determine whether an authorized promoter is utilized to deploy the job con troll language for the authorized accounting entity; and determine whether the job control language is deployed into an authorized change repository for the authorized accounting entity.

In accordance with an exemplary embodiment, the at least one batch utility function may include at least one from among an update utility function, a deploy utility function, and an execute utility function.

In accordance with an exemplary embodiment, for the update utility function, the processor may be further configured to copy the job control language input library into a new input library; automatically insert, into the new input library, a comment card that includes an accounting entity corresponding to the job control language; and verify that the new input library is authorized to use the accounting entity.

In accordance with an exemplary embodiment, for the deploy utility function, the processor may be further configured to determine a first authority level of a promoter corresponding to the change promotion request; and determine a second authority level corresponding to a protected change repository corresponding to the billing entity identifier.

In accordance with an exemplary embodiment, for the execute utility function, the processor may be further configured to verify, by using the logon identifier, the execution of the at least one job file with the billing entity identifier; verify, by using the logon identifier and a job name corresponding to the at least one job file, the execution of the at least one job file with a dynamic billing entity identifier; and verify, by using the logon identifier, the execution of the at least one job file with the billing entity identifier included in the job control language.

In accordance with an exemplary embodiment, the override statement includes a job billing entity identifier that is supplied by the user.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
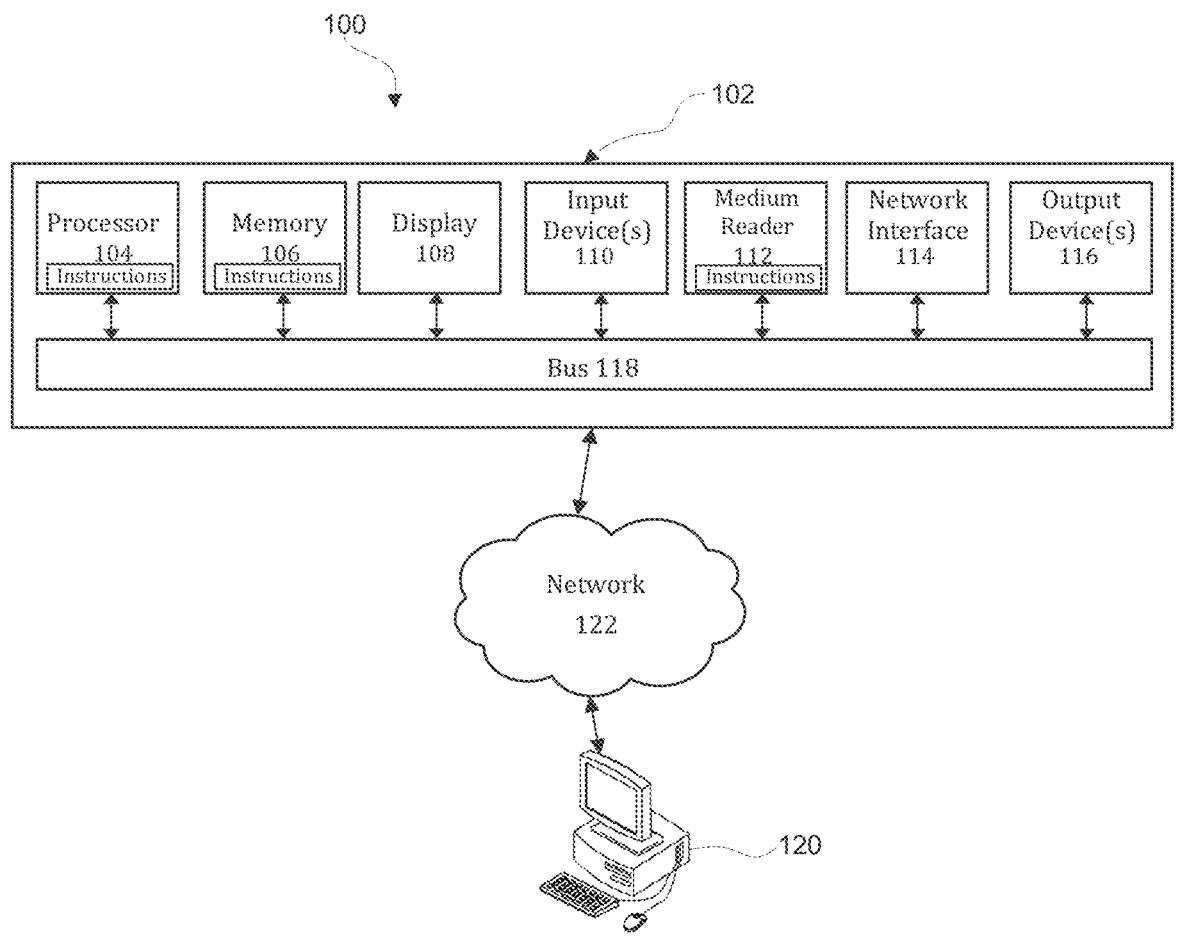
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions ((sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly, understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for managing mainframe billable resources for a plurality of mainframe environments by proactively mapping, authorizing, and enforcing utilization of a standard mainframe accounting entity.

Figure 2:
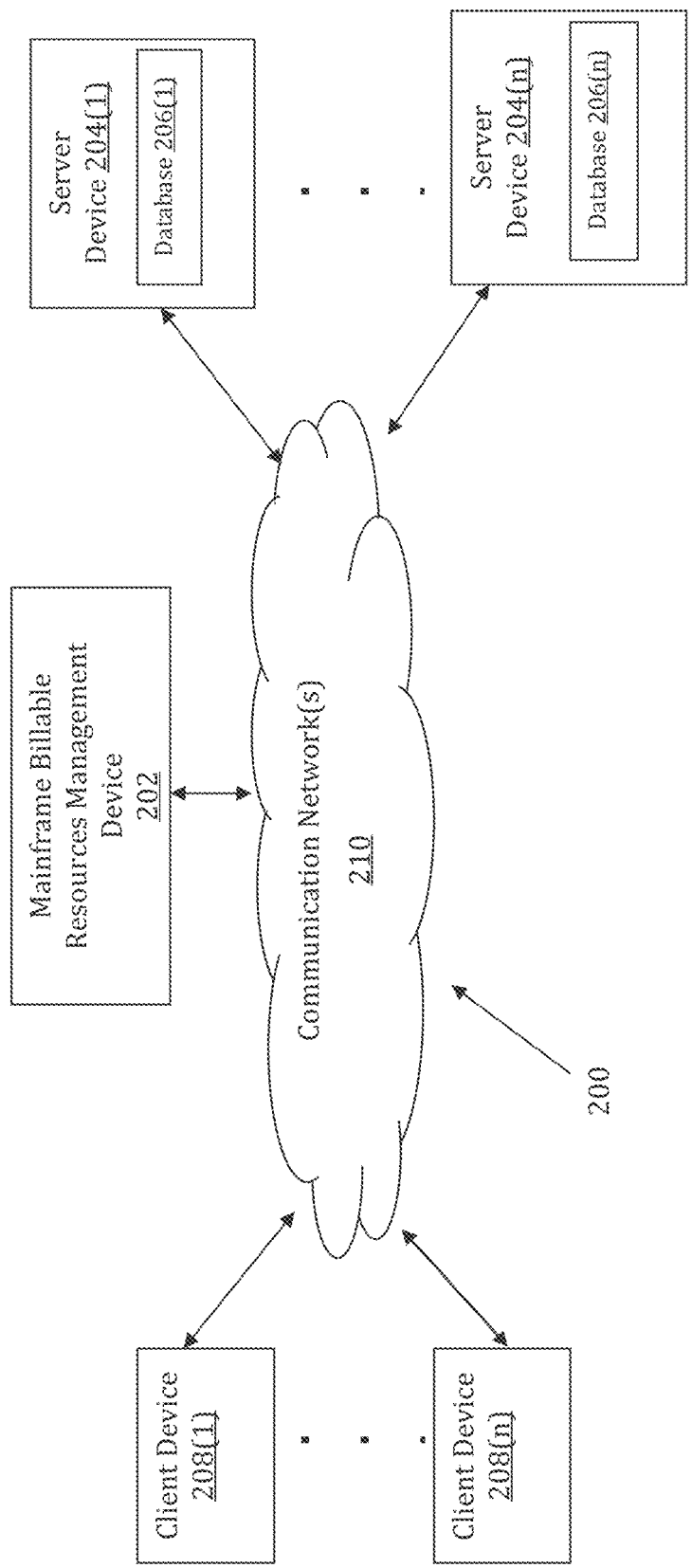
FIG. 2 illustrates an exemplary diagram of a network environment.

Referring to FIG. 2, a schematic of an exemplary network environment 200 for implementing a method for managing mainframe billable resources for a plurality of mainframe environments by proactively mapping, authorizing, and enforcing utilization of a standard mainframe accounting entity is illustrated. In an exemplary embodiment, the method is executable on any networked computer platform, such as, for example, a personal computer (PC).

The method for managing mainframe billable resources for a plurality of mainframe environments by proactively mapping, authorizing, and enforcing utilization of a standard mainframe accounting entity may be implemented by a Mainframe Billable Resources Management (MBRM) device 202. The MBRM device 202 may be the same or similar to the computer system 102 as described with respect to FIG. 1. The MBRM device 202 may store one or more applications that can include executable instructions that, when executed by the MBRM device 202, cause the MBRM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MBRM device 202 itself, may be located in virtual server(s) running in a cloud-based computing environment rather than being tied to one or more specific physical network computing devices. Also, the application(s) may be running in one or more virtual machines (VMs) executing on the MBRM device 202. Additionally, in one or more embodiments of this technology, virtual machine(s) running on the MBRM device 202 may be managed or supervised by a hypervisor.

In the network environment 200 of FIG. 2, the MIMI device 202 is coupled to a plurality of server devices 204(1)-204(n) that hosts a plurality of databases 206(1)-206(n), and also to a plurality of client devices 208(1)-208(n) via communication network(s) 210. A communication interface of the MBRM device 202, such as the network interface 114 of the computer system 102 of FIG. 1, operatively couples and communicates between the MBRM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MBRM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and MBRM devices that efficiently implement a method for managing mainframe billable resources for a plurality of mainframe environments by proactively mapping, authorizing, and enforcing utilization of a standard mainframe accounting entity.

By way of example only, the communication network(s) 210 may include local area network(s) (LANs)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based. Packet Data Networks (PDNs), combinations thereof, and the like.

The MBRM device 202 may be a standalone device or integrated with one or more other devices or apparatuses, such as one or more of the server devices 204(1)-204(n), for example. In one particular example, the device 202 may include or be hosted by one of the server devices 204(1)-204(n) and other arrangements are also possible. Moreover, one or more of the devices of the MBRM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MBRM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to billing entity identifiers, system management facilities (SMF) records, mapping strategies, logon identifiers, grace period data, and data logs.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, Whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the MBRM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interlace to communicate with the MBRM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the MBRM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MBRM device 202, the server devices 204(1)-204(n), or the client devices 208(1)-208(n), for example, may be configured to operate as virtual instances on the same physical machine. In other words, one or more of the MBRM device 202, the server devices 204(1)-204(n), or the client devices 208(1)-208(n) may operate on the same physical device rather than as separate devices communicating through communication network(s) 210. Additionally, there may be more or fewer MBRM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
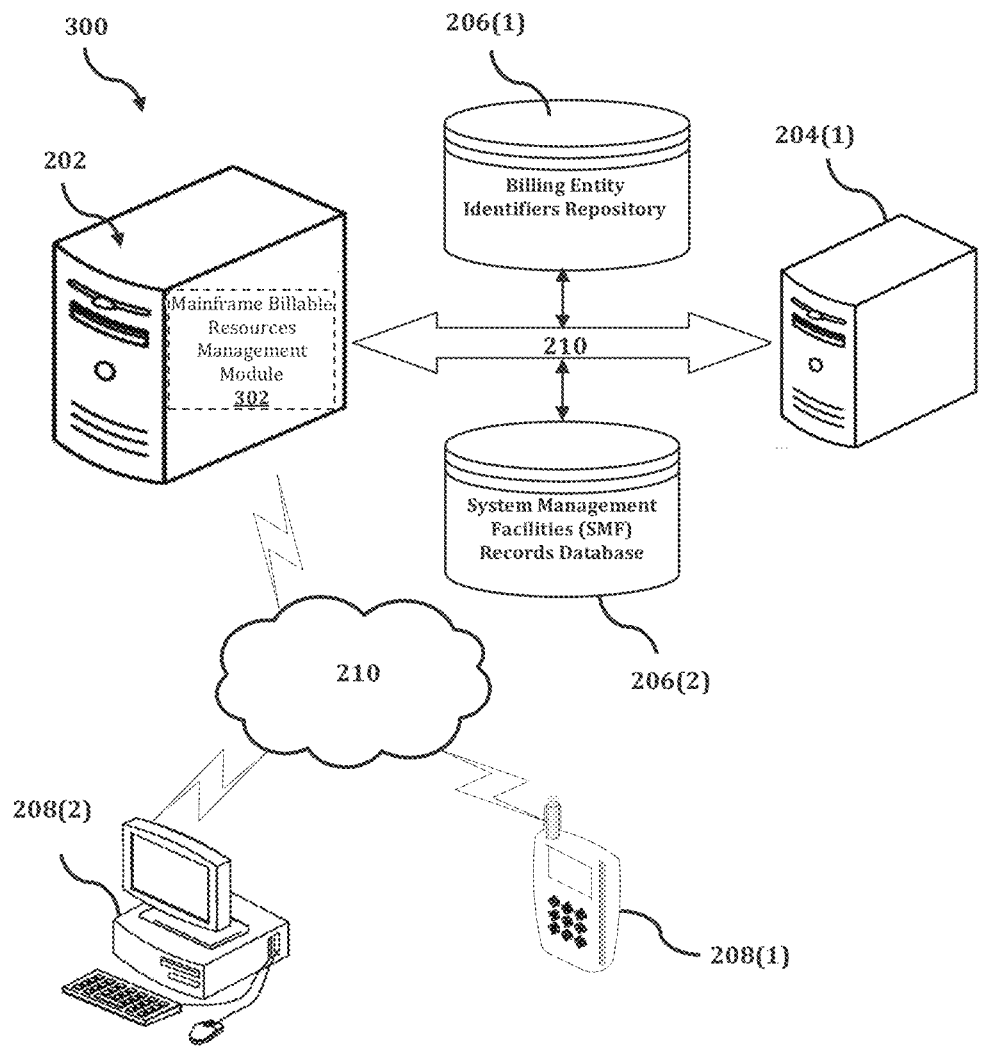
FIG. 3 shows an exemplary system for implementing a method for managing mainframe billable resources for a plurality of mainframe environments h proactively mapping, authorizing, and enforcing utilization of a standard mainframe accounting entity.

The MBRM device 202 is described and shown in FIG. 3 as including a mainframe billable resources management module 302, although it may include other rules, policies, modules, databases, or applications, for example. As will be described below, the mainframe billable resources management module 302 is configured to implement a method for managing mainframe billable resources for a plurality of mainframe environments by proactively mapping, authorizing, and enforcing utilization of a standard mainframe accounting entity.

An exemplary process 300 for implementing a mechanism for managing mainframe billable resources for a plurality of mainframe environments by proactively mapping, authorizing, and enforcing utilization of a standard mainframe accounting entity by utilizing the network environment of FIG. 2 is shown as being executed in FIG. 3. Specifically, a first client device 208(1) and a second client device 208(2) are illustrated as being in communication with MBRM device 202. In this regard, the first client device 208(1) and the second client device 208(2) may be "clients" of the MBRM device 202 and are described herein as such. Nevertheless, it is to be known and understood that the first client device 208(1) and/or the second client device 208(2) need not necessarily be "clients" of the MBRM device 202, or any entity described in association therewith herein. Any additional or alternative relationship may exist between either or both of the first Client device 208(1) and the second client device 208(2) and the MBRM device 202, or no relationship may exist.

Further, MBRM device 202 is illustrated as being able to access a billing entity identifiers repository 206(1) and a system management facilities (SMF) records database 204(2). The mainframe billable resources management module 302 may be configured to access these databases for implementing a method for managing mainframe billable resources for a plurality of mainframe environments by proactively mapping, authorizing, and enforcing utilization of a standard mainframe accounting entity.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the MBRM device 202 via broadband or cellular communication. Of course, these embodiments are merely exemplary and are not limiting or exhaustive.

Upon being started, the mainframe billable resources management module 302 executes a process for managing mainframe billable resources for a plurality of mainframe environments by proactively mapping, authorizing, and enforcing utilization of a standard mainframe accounting entity. An exemplary process for managing mainframe billable resources for a plurality of mainframe environments by proactively mapping, authorizing, and enforcing utilization of a standard mainframe accounting entity is generally indicated at flowchart 400 in FIG. 4.

Figure 4:
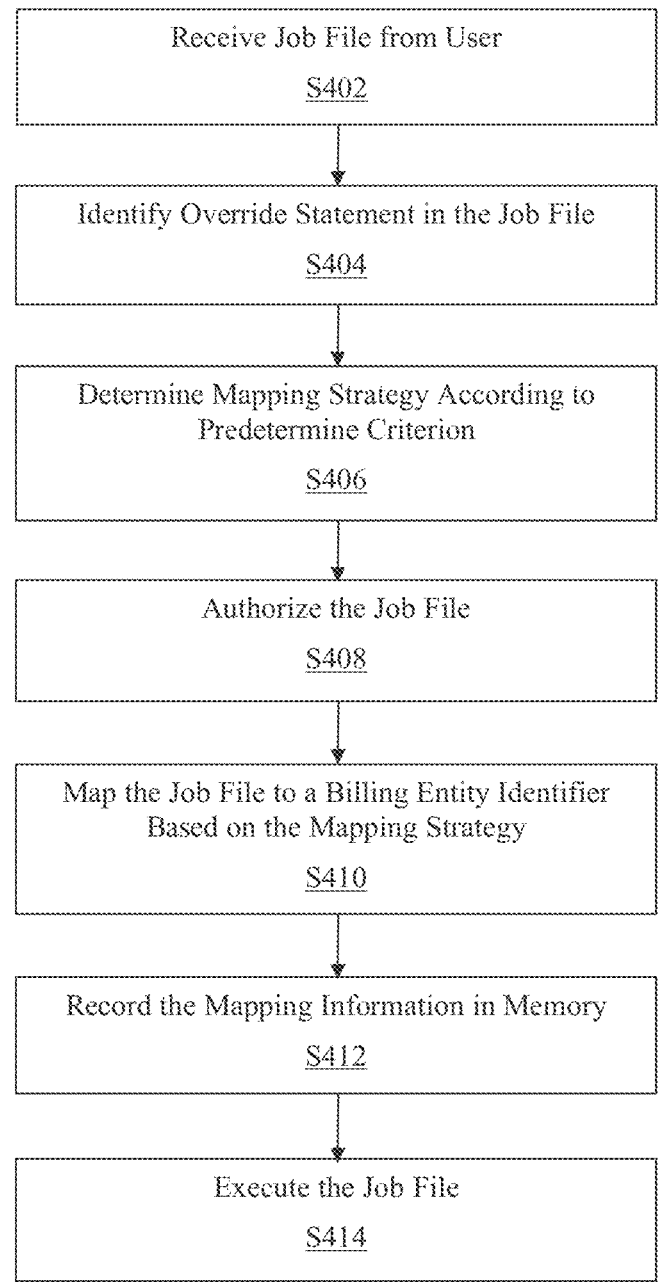
FIG. 4 is a flowchart of an exemplary process for implementing a method for managing mainframe billable resources for a plurality of mainframe environments by proactively mapping, authorizing, and enforcing utilization of a standard mainframe accounting entity.

In the process 400 of FIG. 4, at step S402, a job file may be received from a user. The job file may include a batch file relating to at least one from among a mainframe job and a mainframe task. In an exemplary embodiment, the job file may be received from an application. The application may include at least one from among a monolithic application and a microservice application. In another exemplary embodiment, the job file may be received as an input from a user via a graphical user interface.

In another exemplary embodiment, the job file may include scripting languages such as, for example, a job control language used by mainframe operating systems to instruct mainframe environments on how a batch job is run. The job control language may also be used by the mainframe operating system to start a subsystem within the mainframe environment. As will be appreciated by a person of ordinary skill in the art, the job control language may be used to indicate which programs to run using which files and/or devices at which times.

At step S404, an override statement may be identified in the job file. The override statement may include a job billing entity identifier that is supplied by the user. In an exemplary embodiment, the override statement may be included by the user when a specific billing entity is desired for the job file. For example, when billing entity A is known to correspond to job file A, the user may elect to include an override statement in the job file. In another exemplary embodiment, the override statement may serve to bypass steps associated with the mapping of the job file to a billing entity.

At step S406, a mapping strategy may be determined according to a predetermined criterion based on a result of the identifying. The mapping strategy may relate to a mapping of the job file to a billing entity identifier. In an exemplary embodiment, the billing entity identifier may include a standard billing entity identifier such as, for example, a standard engineering and architecture library (SEAL) billing entity identifier. The standard billing entity identifier may relate to a standard for application ownership and billing across all platforms. In another exemplary embodiment, the mapping strategy may include automated mapping methodologies and manual mapping methodologies to dynamically map the job files to an appropriate billing entity identifier. In another exemplary embodiment, the predetermined criterion may relate to characteristics of the job file such as, for example, a job name, a job logon identifier, a job unique identifier (UID), and a job account number.

In another exemplary embodiment, the mapping strategy may include a job name pattern mapping strategy. The job name pattern mapping strategy may utilize a job name pattern within the job file to dynamically assign mainframe jobs and tasks to an appropriate application identifier. In another exemplary embodiment, the job name pattern mapping strategy may be useful for lines of business with job name patterns which are consistent and unique to the application as well as the lines of business. The job name pattern mapping strategy may provide granular automated mapping of production jobs.

In another exemplary embodiment, the mapping strategy may include a role-based mapping strategy. The role-based mapping strategy may utilize a job logon identifier role and/or a unique identifier (UID) string to dynamically assign mainframe jobs and tasks to an appropriate application identifier. In another exemplary embodiment, the role-based mapping strategy may be useful for lines of business with unique production job logon identifiers and for the development of user jobs. The role-based mapping strategy may improve reliability for production jobs that do not conform to a unique line of business or to a unique job name pattern.

In another exemplary embodiment, the mapping strategy may include a job account number mapping strategy. The job account number mapping strategy may utilize a job account number to dynamically assign mainframe jobs to an appropriate application identifier based on information such as, for example, a job card account number associated with the job file at submission. In another exemplary embodiment, the job account number mapping strategy may be useful for lines of business with unique and consistent job card account numbers. The job account mapping strategy may improve reliability of job file mapping in situations where a line of business is unable to use a job name pattern mapping strategy and role-based mapping strategy.

In another exemplary embodiment, the mapping strategy may include a job control language override mapping strategy. The job control language override mapping strategy may utilize a script command within the job control language to explicitly assign an application identifier to the job file during job submission. In another exemplary embodiment, the job control language override mapping strategy may be useful for lines of business that are unable to utilize an automated application identifier mapping strategy and may provide a process for the lines of business to include an exception and/or an override to existing mapping strategies. The job control language override mapping strategy in ay provide lines of business with granular abilities to specify the application identifier and/or override the application identifier. As will be appreciated by a person of ordinary skill in the art, due to the job control language script command, all job files may require a job control language update to specify the application identifier.

At step S408 the job file may be authorized based on the billing entity identifier and a logon identifier that corresponds to the user. In an exemplary embodiment, an authority level associated with the logon identifier may be compared to an authority level required for executing the job file under the billing entity identifier. For example, the job file may be authorized when the logon identifier is authorized to execute the job file using the billing entity identifier.

In another exemplary embodiment, a grace period for the job file may be determined when the logon identifier is not authorized to use the billing entity identifier. The grace period may include a deferred enforcement period corresponding to a warning mode. Then, grace period data relating to the determined grace period may be appended to the job file.

At step S410, the job file may be mapped to the billing entity identifier based on the determined mapping strategy. In an exemplary embodiment, the billing entity identifier may be appended to the job file as well as associated with the job file. Then, at step S412, information relating to the mapping may be recorded in a memory. In an exemplary embodiment, the information may be stored in a system management facilities (SW) record. The SMF record may contain information relating to usage of billable accounting identifiers for all attempted job file submissions. In another exemplary embodiment, the SMF record may be utilized for supporting mainframe accounting and billing reconciliation.

At step S414, the job file may be executed in a mainframe environment. As will be appreciated by a person of ordinary skill in the art, the mainframe environment may execute the job file and direct the results to an output queue.

In another exemplary embodiment, the execution of the at least one job file may be prevented based on the grace period data when the logon identifier is not authorized to use the billing entity identifier. Information relating to at least one from among the job file, the logon identifier, and the billing entity identifier may be logged. Then, the logged information may be recorded in the memory.

In another exemplary embodiment, a change promotion request relating to a deployment of the batch file into a change repository may be received. A job control language corresponding to the received change promotion request may be identified. A batch utility function may be invoked. A change promotion request may be authorized based on the identified job control language by using the invoked batch utility function. Then, the change promotion request may be executed in the mainframe environment based on a result of the authorizing.

In another exemplary embodiment, the batch utility function may include at least one from among an update utility function, a deploy utility function, and an execute utility function. The batch utility function may enable the user to preview the user's job authority to use a billable entity without requiring elevated privileges and without requiring security administrator assistance. Additionally, the batch utility function may enable the user to directly perform bulk job control language updates and promotion of jobs by specifying a specific accounting entity. By directly specifying a specific accounting entity, the user may bypass dynamic assignment of accounting entities based on the job name and/or the job logon identifier role. As will be appreciated by a person of ordinary skill in the art, the batch utility function may be utilized for bulk job file inquires as well as ad-hoc inquiries by the user.

In another exemplary embodiment, the update utility function may include copying the job control language input library into a new input library. Then, a comment card that may include an accounting entity corresponding to the job control language may be automatically inserted into the new input library. Finally, the new input library, including any job control language members, may be verified to ensure that the new input library is authorized to use the accounting entity.

In another exemplary embodiment, the deploy utility function may include determining a first authority level of a promoter corresponding to the change promotion request. Additionally, a second authority level of a protected change repository corresponding to the billing entity identifier may also be determined.

In another exemplary embodiment, the execute utility function may include verifying, by using the logon identifier, the execution of the job file together with the billing entity identifier. The execute utility function may also include verifying, by using the logon identifier and a job name corresponding to the job file, the execution of the job file together with a dynamic billing entity identifier. Finally, the execute utility function may include verifying, by using the job control language and the logon identifier, the execution of the job file together with the billing entity identifier.

In another exemplary embodiment, the change promotion request may be authorized by determining whether an authorized accounting entity is assigned to the job control language. Similarly, a determination may be made as to whether an authorized promoter is utilized to deploy the job control language for the authorized accounting entity. Finally, a determination may also be made as to whether the job control language is deployed into an authorized change repository for the authorized accounting entity.

In an exemplary embodiment, security resource rules may control and authorize all functions via proprietary mainframe security rules designed to work under an access control facility (ACF2) mainframe security product and a resource access control facility (RACF) mainframe security product. The ACF2 may include commercial, discretionary access control software security systems developed for mainframe operating systems. The RACF may include security systems that provide access control and auditing functionalities for mainframe operating systems.

In another exemplary embodiment, the security resource rules may include an accounting entity authorization rule. The accounting entity authorization rule may be utilized to determine the permissions required for use of protected accounting entities in functions relating to job file execution, change promotion/deployment, and protection of change repositories.

In another exemplary embodiment, the security resource rules may include an accounting entity dynamic assignment rule. The accounting entity dynamic assignment rule may be utilized to determine the initial dynamic assignment at job file submission to an accounting entity based on a matching of a job name pattern and/or a role assigned to a logon identifier corresponding to the job file. When a match is determines on one of the dynamic assignment rules, the accounting entity is selected as a candidate. In another exemplary embodiment, permission to use the dynamically assigned accounting entity is provided via a security call to the corresponding accounting entity authorization rule.

In another exemplary embodiment, a simulator utility may be included and may be used to test and/or simulate the results of job file submissions. The simulator utility may allow system programmers to preview results of job file processing based on disclosures in the present application. The simulator utility may be used to quickly test and validate disclosures in the present application by allowing a system programmer to preview mapping results for any job name, logon identifier, and billable accounting entity.

Figure 5:
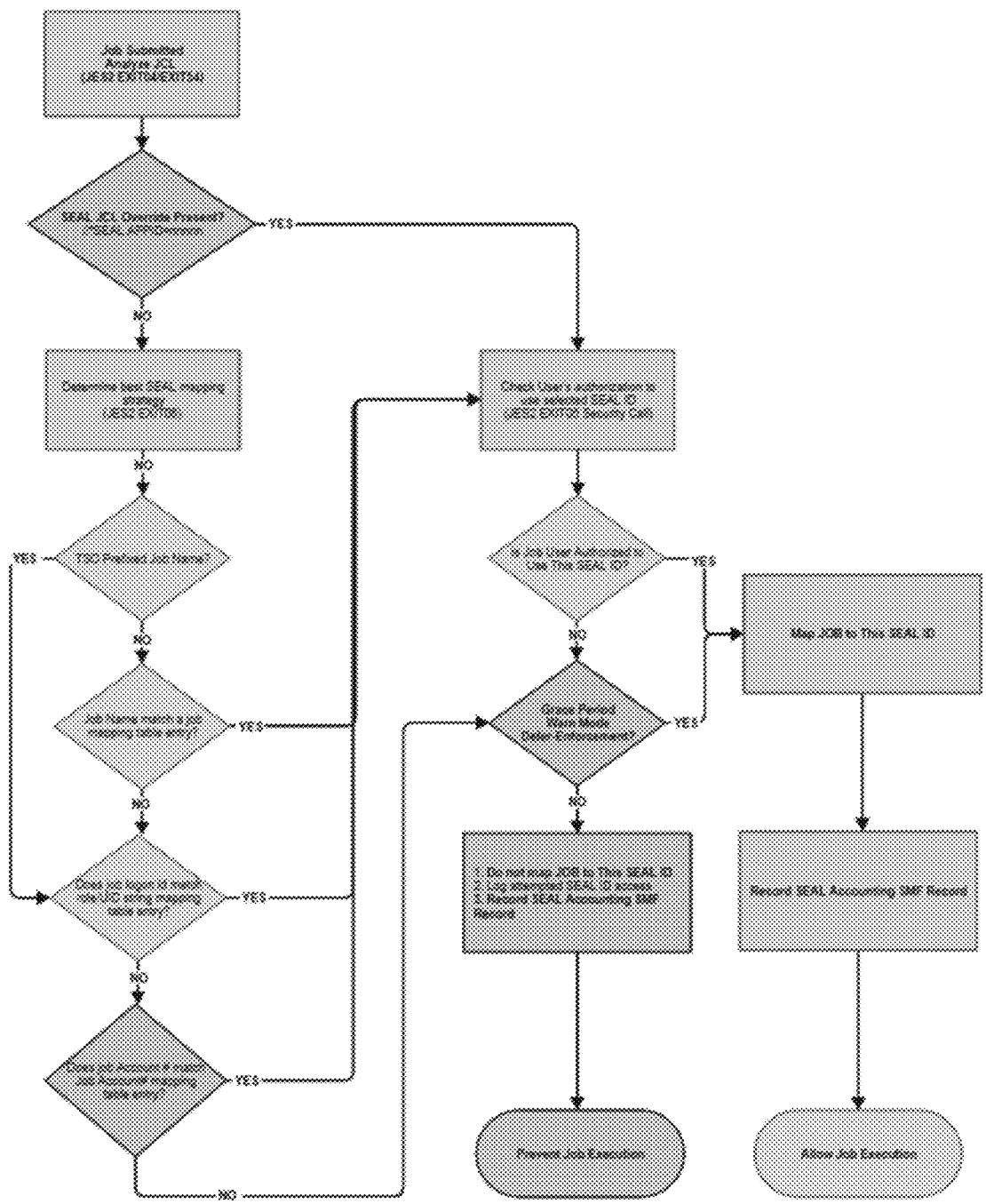
FIG. 5 is a flowchart that illustrates a job execution enforcement workflow that is usable for implementing a method for managing mainframe billable resources for a plurality of mainframe environments by proactively mapping, authorizing, and enforcing utilization of a standard mainframe accounting entity, according to an exemplary embodiment.

FIG. 5 is a flowchart 500 that illustrates a job execution enforcement workflow that is usable for implementing a method for managing mainframe billable resources for a plurality of mainframe environments by proactively mapping, authorizing, and enforcing utilization of a standard mainframe accounting entity, according to an exemplary embodiment. In flowchart 500, a job file is submitted and mapped to a standard billing entity identifier.

As illustrated in FIG. 5, a job is submitted and the job control language corresponding to the job is analyzed. A determination is made as to whether a job control language override is present in the submitted job. When a job control language override is present, the process proceeds to the authorization step. However, when a job control language override is not present, the process determines the best mapping strategy for assigning a standard billing, entity identifier. To determine the best mapping strategy, information relating to the job may be identified. The information may include a prefixed job name, whether the job name matches a job mapping table entry, and whether the job logon identifier matches a role and/or unique identifier (UID) string mapping table entry. When a job account number matches a job account number mapping table entry, the process proceeds to the authorization step.

At the authorization step, the system checks the user's authorization to use the selected standard billing entity identifier. When the job user is authorized to use the selected standard billing entity identifier, the job is mapped to the standard billing entity identifier, executed, and information relating to the mapping is recorded in an accounting system management facilities (SMF) record.

However, when the job user is not authorized to use the selected standard billing entity identifier, a determination is made as to whether the job qualifies for a warn mode that includes, for example, a grace period and a deferred enforcement period. When the job qualifies for the warn mode, the job is mapped to the standard billing entity identifier and information relating to the mapping is recorded in the SMF record. However, when the job does not qualify for the warn mode, the job is prevented from being mapped to the selected standard billing entity identifier and a log of the attempted access of the standard billing entity identifier is generated. The log is recorded in the SMF record.

Figure 6:
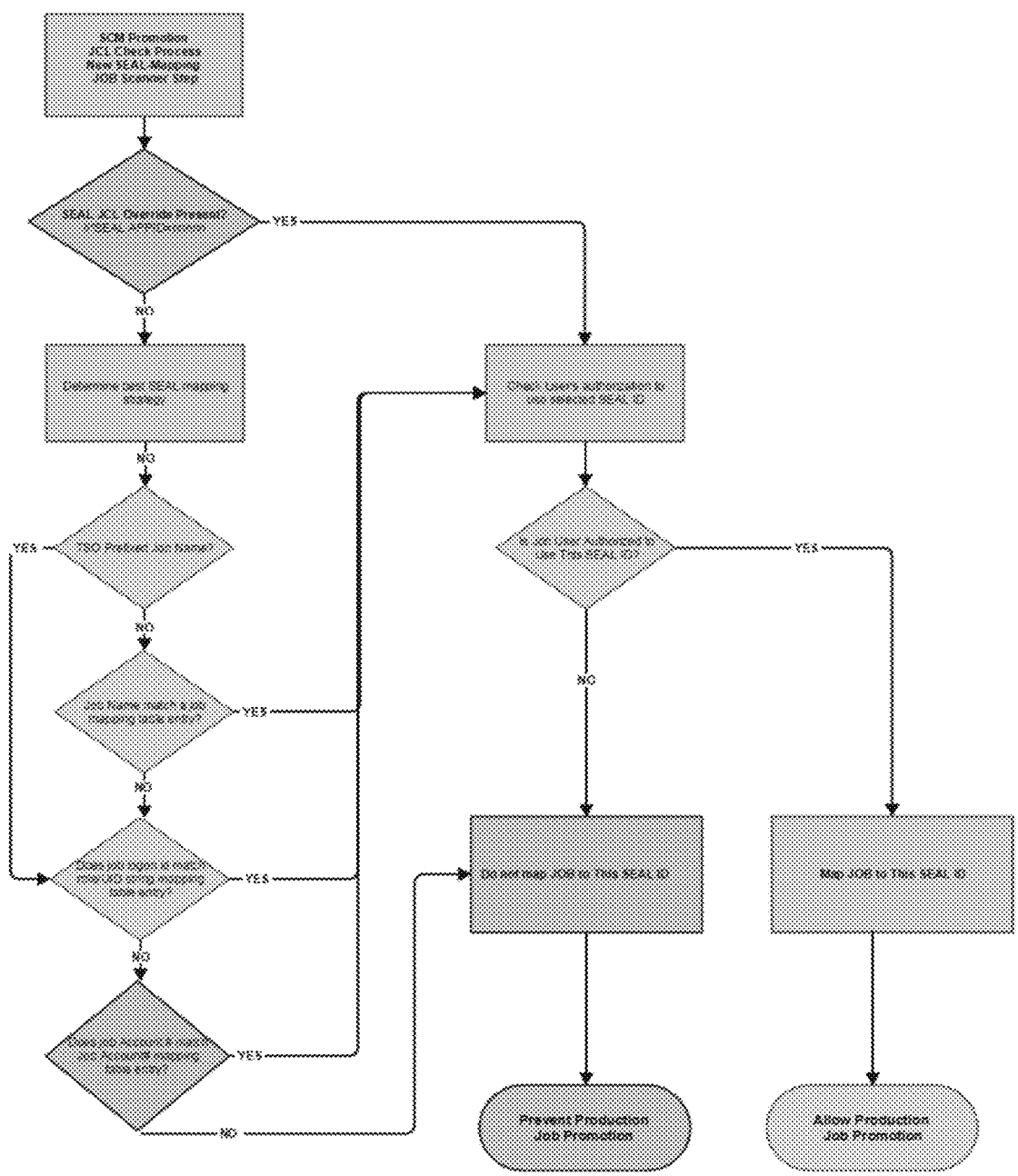
FIG. 6 is a flowchart that illustrates a job promotion workflow that is usable for implementing a method for managing mainframe billable resources for a plurality of mainframe environments by proactively mapping, authorizing, and enforcing utilization of a standard mainframe accounting entity, according to an exemplary embodiment.

FIG. 6 is a flowchart 600 that illustrates a job promotion workflow that is usable for implementing a method for managing mainframe billable resources for a plurality of mainframe environments by proactively mapping, authorizing, and enforcing utilization of a standard mainframe accounting entity, according to an exemplary embodiment. In flowchart 600, a change promotion request relating to a deployment of the job into a change repository is submitted for mapping to a standard billing entity identifier.

As illustrated in FIG. 6, a change promotion request job is submitted and the job control language corresponding to the job is analyzed. A determination is made as to whether a job control language override is present in the submitted job. When a job control language override is present, the process proceeds to the authorization step. However, when a job control language override is not present, the process determines the best mapping strategy for assigning a standard billing entity identifier. To determine the best mapping strategy, information relating to the job may be identified. The information may include a prefixed job name, whether the job name matches a job mapping table entry, and whether the job logon identifier matches a role and/or unique identifier (UID) string mapping table entry. When a job account number matches a job account number mapping table entry, the process proceeds to the authorization step.

At the authorization step, the system checks the user's authorization to use the selected standard billing entity identifier. When the job user is authorized to use the selected standard billing entity identifier, the job is mapped to the standard billing entity identifier and the production job promotion is allowed. However, when the job user is not authorized to use the selected standard billing entity identifier, the job is not mapped to the standard billing entity identifier and the production job promotion is prevented.

Accordingly, with this technology, an optimized process for managing mainframe billable resources for a plurality of mainframe environments by proactively mapping, authorizing, and enforcing utilization of a standard mainframe accounting entity is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing mainframe billable resources for a plurality of mainframe environments, the method being implemented by at least one processor, the method comprising:

receiving, by the at least one processor, at least one job file from a user, the at least one job file including a batch file relating to at least one from among a mainframe job and a mainframe task;

identifying, by the at least one processor, an override statement in the at least one job file, the override statement including a billing entity identifier, and the billing entity identifier includes a standard engineering and architecture library billing entity identifier that is applicable across a plurality of platforms;

retrieving, by the at least one processor and from a first network database storing a plurality of billing entity identifiers, the billing entity identifier;

determining, by the at least one processor based on a result of the identifying, at least one mapping strategy according to at least one predetermined criterion, the at least one mapping strategy relating to a mapping of the at least one job file to a billing entity identifier;

determining to authorize or not, by the at least one processor, the at least one job file based on the billing entity identifier and a logon identifier corresponding to the user;

determining whether the user is authorized to use the billing entity identifier;

mapping, by the at least one processor, the at least one job file to the billing entity identifier based on the determined at least one mapping strategy, wherein the at least one mapping strategy utilizes a job name pattern within the job file to dynamically and automatically assign the mainframe job and the mainframe task to an application identifier;

recording, by the at least one processor in a memory, information relating to the mapping;

when the at least one job file is determined to be authorized,
  executing, by the at least one processor in a mainframe environment, the at least one job file,
  retrieving, by the at least one processor and from a second network database storing usage information for a plurality of job files, usage information corresponding to the at least one job file that is executed, and
  associating the usage information corresponding to the at least one job file with the billing entity identifier for tracking mainframe resource usage information of the user; and
when the at least one job file is determined not to be authorized, determining whether or not the at least one job file is within a deferred enforcement period corresponding to a warning mode, and
  when the at least one job file is determined to be within the deferred enforcement period corresponding to the warning mode, performing the mapping of the at least one job file to the billing entity identifier based on the determined at least one mapping strategy, and
  when the at least one job file is determined not to be within the deferred enforcement period corresponding to the warning mode, preventing, by the at least one processor, execution of the at least one job file.

2. The method of claim 1, further comprising:
determining, by the at least one processor, a grace period for the at least one job file when the logon identifier is not authorized to use the billing entity identifier, the grace period including the deferred enforcement period corresponding to the warning mode; and
appending, by the at least one processor to the at least one job file, grace period data relating to the determined grace period.

3. The method of claim 2, further comprising:
preventing, by the at least one processor, the execution of the at least one job file based on the grace period data when the logon identifier is not authorized to use the billing entity identifier;
logging, by the at least one processor, information relating to at least one from among the at least one job file, the logon identifier, and the billing entity identifier; and
recording, by the at least one processor in the memory, the logged information.

4. The method of claim 1, further comprising:
receiving, by the at least one processor, a change promotion request relating to a deployment of the batch file into a change repository;
identifying, by the at least one processor, a job control language corresponding to the received change promotion request;
invoking, by the at least one processor, at least one batch utility function;
authorizing, by the at least one processor using the at least one batch utility function, the change promotion request based on the identified job control language; and
executing, by the at least one processor in the mainframe environment, the change promotion request based on a result of the authorizing.

5. The method of claim 4, wherein authorizing the change promotion request further comprises:
determining, by the at least one processor, whether an authorized accounting entity is assigned to the job control language;
determining, by the at least one processor, whether an authorized promoter is utilized to deploy the job control language for the authorized accounting entity; and
determining, by the at least one processor, whether the job control language is deployed into an authorized change repository for the authorized accounting entity.

6. The method of claim 4, wherein the at least one batch utility function includes at least one from among an update utility function, a deploy utility function, and an execute utility function.

7. The method of claim 6, wherein the update utility function further comprises:
copying, by the at least one processor, the job control language input library into a new input library;
automatically inserting, by the at least one processor into the new input library, a comment card that includes an accounting entity corresponding to the job control language; and
verifying, by the at least one processor, that the new input library is authorized to use the accounting entity.

8. The method of claim 6, wherein the deploy utility function further comprises:
determining, by the at least one processor, a first authority level of a promoter corresponding to the change promotion request; and
determining, by the at least one processor, a second authority level of a protected change repository corresponding to the billing entity identifier.

9. The method of claim 6, wherein the execute utility function further comprises:
verifying, by the at least one processor using the logon identifier, the execution of the at least one job file with the billing entity identifier;
verifying, by the at least one processor using the logon identifier and a job name corresponding to the at least one job file, the execution of the at least one job file with a dynamic billing entity identifier; and
verifying, by the at least one processor using the logon identifier, the execution of the at least one job file with the billing entity identifier included in the job control language.

10. A computing device configured to implement an execution of a method for managing mainframe billable resources for a plurality of mainframe environments, the computing device comprising:
a processor;
a memory; and
a communication interface coupled to each of the processor and the memory, wherein the processor is configured to:
  receive at least one job file from a user, the at least one job file including a batch file relating to at least one from among a mainframe job and a mainframe task;
  identify an override statement in the at least one job file, the override statement including a billing entity identifier, and the billing entity identifier includes a standard engineering and architecture library billing entity identifier that is applicable across a plurality of platforms;
  retrieve, from a first network database storing a plurality of billing entity identifiers, the billing entity identifier;
  determine, based on a result of the identifying, at least one mapping strategy according to at least one predetermined criterion, the at least one mapping strategy relating to a mapping of the at least one job file to a billing entity identifier;

determine to authorize or not the at least one job file based on the billing entity identifier and a logon identifier corresponding to the user;
determine whether the user is authorized to use the billing entity identifier;
map the at least one job file to the billing entity identifier based on the determined at least one mapping strategy, wherein the at least one mapping strategy utilizes a job name pattern within the job file to dynamically and automatically assign the mainframe job and the mainframe task to an application identifier;
record, in the memory, information relating to the mapping;
when the at least one job file is determined to be authorized,
execute, in a mainframe environment, the at least one job file,
retrieve, from a second network database storing usage information for a plurality of job files, usage information corresponding to the at least one job file that is executed, and
associate the usage information corresponding to the at least one job file with the billing entity identifier to track mainframe resource usage information of the user; and
when the at least one job file is determined not to be authorized, determine whether or not the at least one job file is within a deferred enforcement period corresponding to a warning mode, and
when the at least one job file is determined to be within the deferred enforcement period corresponding to the warning mode, perform the mapping of the at least one job file to the billing entity identifier based on the determined at least one mapping strategy, and
when the at least one job file is determined not to be within the deferred enforcement period corresponding to the warning mode, prevent execution of the at least one job file.

11. The computing device of claim 10, wherein the processor is further configured to:
determine a grace period for the at least one job file when the logon identifier is not authorized to use the billing entity identifier, the grace period including the deferred enforcement period corresponding to the warning mode; and
append, to the at least one job file, grace period data relating to the determined grace period.

12. The computing device of claim 11, wherein the processor is further configured to:
prevent the execution of the at least one job file based on the grace period data when the logon identifier is not authorized to use the billing entity identifier;
log information relating to at least one from among the at least one job file, the logon identifier, and the billing entity identifier; and
record, in the memory, the logged information.

13. The computing device of claim 10, wherein the processor is further configured to:
receive a change promotion request relating to a deployment of the batch file into a change repository;
identify a job control language corresponding to the received change promotion request;
invoke at least one batch utility function;
authorize, by using the at least one batch utility function, the change promotion request based on the identified job control language; and
execute, in the mainframe environment, the change promotion request based on a result of the authorizing.

14. The computing device of claim 13, wherein, to authorize the change promotion request, the processor is further configured to:
determine whether an authorized accounting entity is assigned to the job control language;
determine whether an authorized promoter is utilized to deploy the job control language for the authorized accounting entity; and
determine whether the job control language is deployed into an authorized change repository for the authorized accounting entity.

15. The computing device of claim 13, wherein the at least one batch utility function includes at least one from among an update utility function, a deploy utility function, and an execute utility function.

16. The computing device of claim 15, wherein, for the update utility function, the processor is further configured to:
copy the job control language input library into a new input library;
automatically insert, into the new input library, a comment card that includes an accounting entity corresponding to the job control language; and
verify that the new input library is authorized to use the accounting entity.

17. The computing device of claim 15, wherein, for the deploy utility function, the processor is further configured to:
determine a first authority level of a promoter corresponding to the change promotion request; and
determine a second authority level of a protected change repository corresponding to the billing entity identifier.

18. The computing device of claim 15, wherein, for the execute utility function, the processor is further configured to:
verify, by using the logon identifier, the execution of the at least one job file with the billing entity identifier;
verify, by using the logon identifier and a job name corresponding to the at least one job file, the execution of the at least one job file with a dynamic billing entity identifier; and
verify, by using the logon identifier, the execution of the at least one job file with the billing entity identifier included in the job control language.

\* \* \* \* \*